G. J. SIMON.
NUT LOCK.
APPLICATION FILED OCT. 6, 1911.
1,057,465.
Patented Apr. 1, 1913.
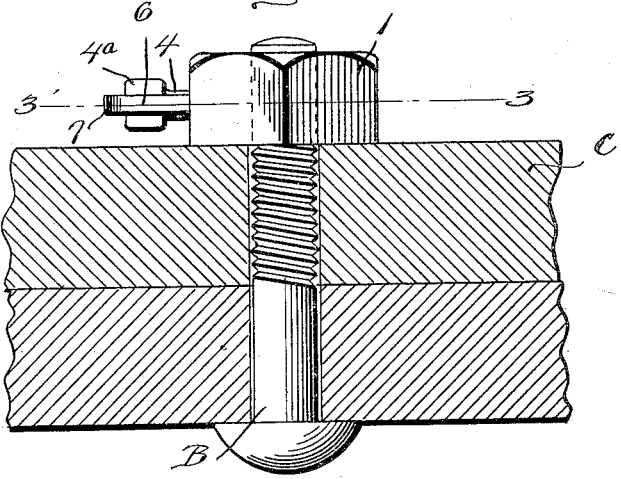
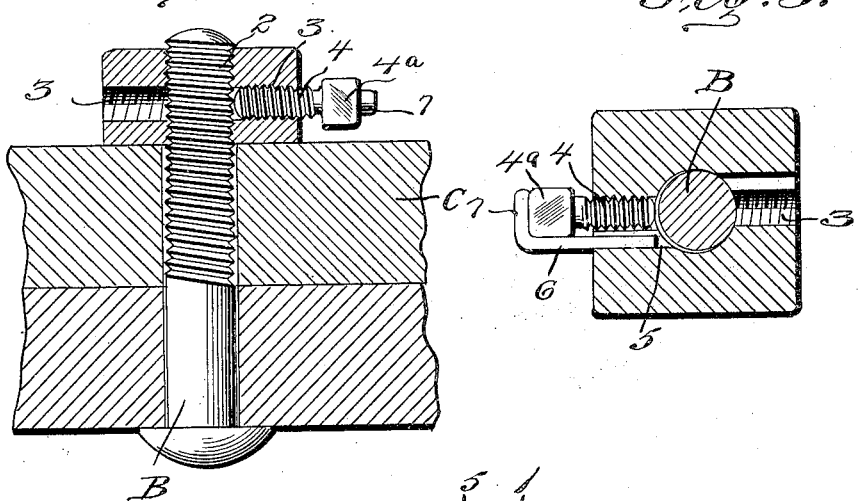
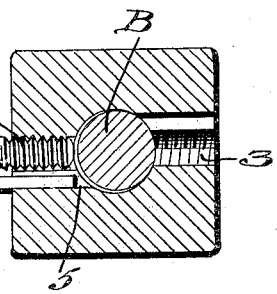
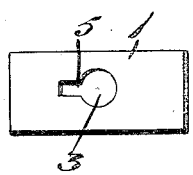
Inventor
George J. Simon.
Witnesses
By _____, Attorney.

UNITED STATES PATENT OFFICE.

GEORGE J. SIMON, OF LA BELLE, PENNSYLVANIA.

NUT-LOCK.

1,057,465.   Specification of Letters Patent.   Patented Apr. 1, 1913.

Application filed October 6, 1911. Serial No. 653,212.

*To all whom it may concern:*

Be it known that I, GEORGE J. SIMON, citizen of the United States, residing at La Belle, in the county of Fayette and State of Pennsylvania, have invented certain new and useful Improvements in Nut-Locks, of which the following is a specification.

This invention relates to lock nuts.

The main object of the invention is the provision of a device of this kind which will be simple and durable in its construction, efficient in the performance of its function and easily manufactured.

A further object is to provide a nut lock embodying a nut having a transverse threaded aperture intersecting its main threads, a clamping member adapted to screw into the end of the aperture and bear against the bolt on which the nut is mounted, and a key adapted to lock the clamping member in engagement with the bolt.

Further objects will appear in the following description, it being understood that changes in the form, proportion and minor details of construction may be resorted to within the scope of the appended claim.

For a full understanding of the invention and the merits thereof, reference is to be had to the following description and the accompanying drawings in which:

Figure 1 is an elevation of the nut lock securing a nut to a bolt which is passed through a piece of work. Fig. 2 is a vertical section thereof. Fig. 3 is a transverse section on the line 3—3 of Fig. 1. Fig. 4 is a side elevation of the nut showing the keyhole slot.

Corresponding and like parts are referred to in the following description and indicated in all the views of the accompanying drawings by the same reference characters.

The nut lock of this invention is shown in the drawing locking the nut 1 to the bolt B which is passed through the work C. The nut 1 is of the usual type with a threaded bore 2; in fact, the standard nut may be used in constructing this device. Extending transversely through this nut and preferably at right angles to the bore 2 is a smaller threaded bore 3. It will be seen that the bore 3 is intersected by the bore 2 and is thus divided into two parts, one on each side of the nut, each adapted to receive a clamping member preferably in the form of a bolt 4 having an angular head 4ᵃ. In order to secure this clamping member in its adjusted position, a preferably rectangular slot or key seat 5 pierces the sides of the nut which are penetrated by the bore 3. These key seats 5 are preferably parallel to and communicate with the bore 3 on opposite sides and are disposed in staggered relation to each other and also open into the bore 2. This arrangement facilitates the construction of the device and thereby lowers its cost of manufacture. A locking key 6 provided with an angular extremity 7 and conforming to the shape of the seat 5 is adapted to be detachably mounted in said seat so that the extremity 7 extends over and abuts the head 4ᵃ of the clamping member 4 with the key 6 in contact with the head 4ᵃ. Attention is called to the fact that the angular extremity 7 which is larger than the body of the bolt further acts as a stop to prevent the pin 6 from entering the bore 2 and bruising the threads of the bolt B. It will also be noted that the key seat 5 in conjunction with the bore 3 forms a keyhole slot adapted to receive the locking means.

In using the nut lock its operation is apparent. The nut 1 is screwed upon the bolt B until the desired adjustment is attained. Thereafter the clamping member 4 is forced into contact with the bolt B and locks the members in this position. To prevent the clamping member 4 from loosening and becoming disengaged from the bolt B, the key 6 is forced into the key seat 5 so that it bears against the side of the head 4ᵃ, thus preventing the turning of the clamping member 4. The angular extremity 7 of said key overhangs the head 4ᵃ and permits the pin to be readily withdrawn from the seat 5 if a wedge is forced between the head 4ᵃ and said extremity. In some cases it might be deemed advisable to use a clamping member and a key on each side of the nut, and therefore provision is made to this end.

Having thus described the invention, what is claimed as novel is:

In a nut lock a nut having a lateral threaded aperture communicating with the bore of the nut and with a key way opening into the aperture, a set screw engaging in the threaded aperture and having a square head externally of the nut, and a key engaging in the key way and bearing against the head at one side and with a lateral offset engaging over the outer end of the head.

In testimony whereof I affix my signature in presence of two witnesses.

GEORGE J. SIMON. [L. S.]

Witnesses:
JOSEF SZABOLIK,
PAUL SIMON.

Copies of this patent may be obtained for five cents each, by addressing the "Commissioner of Patents, Washington, D. C."